3,263,471
HEADING APPARATUS
William C. Martin and Gustav O. Stegner, Naperville, Ill., assignors to Western Electric Company, Incorporated, New York, N.Y., a corporation of New York
Filed May 28, 1963, Ser. No. 283,897
9 Claims. (Cl. 72—294)

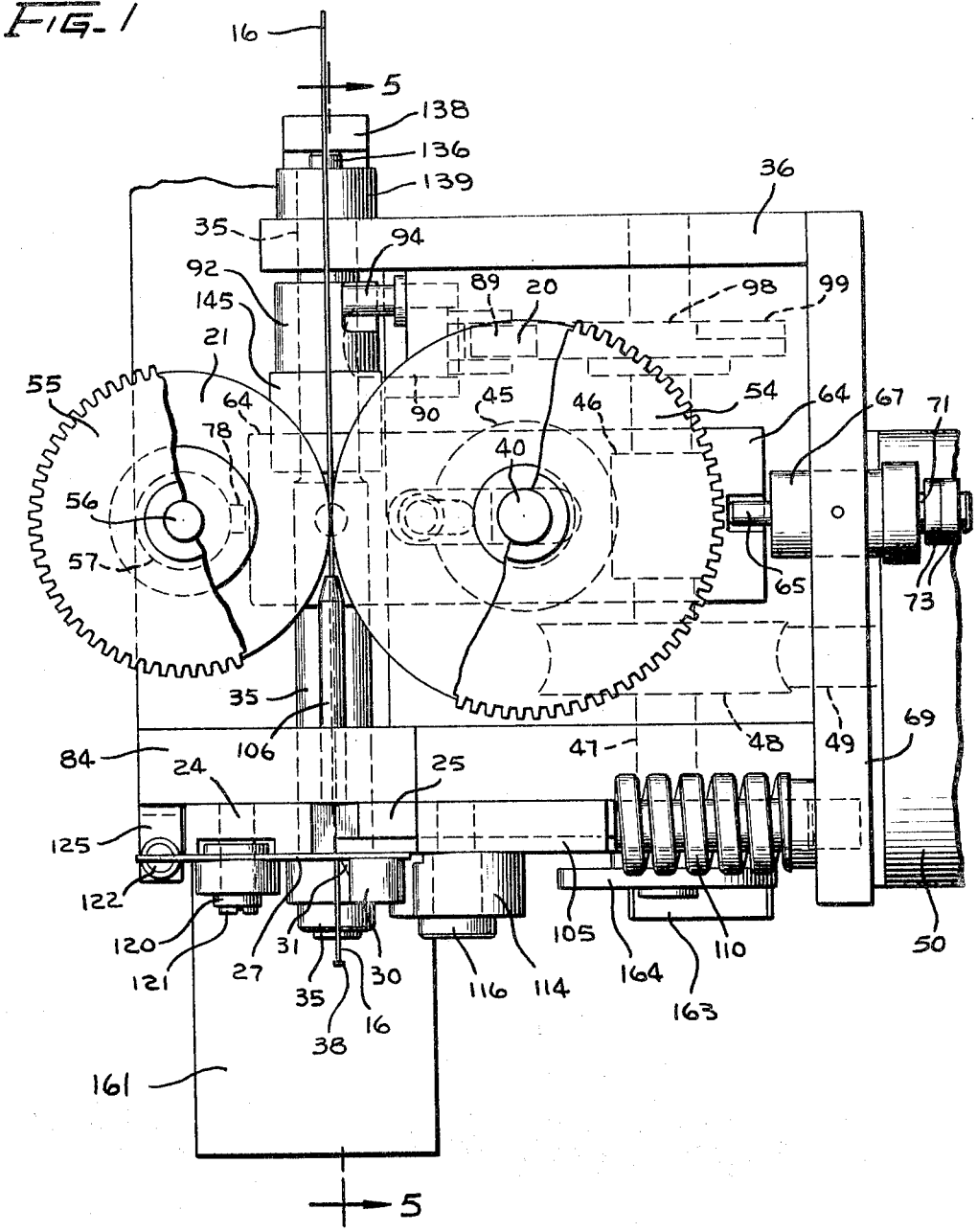

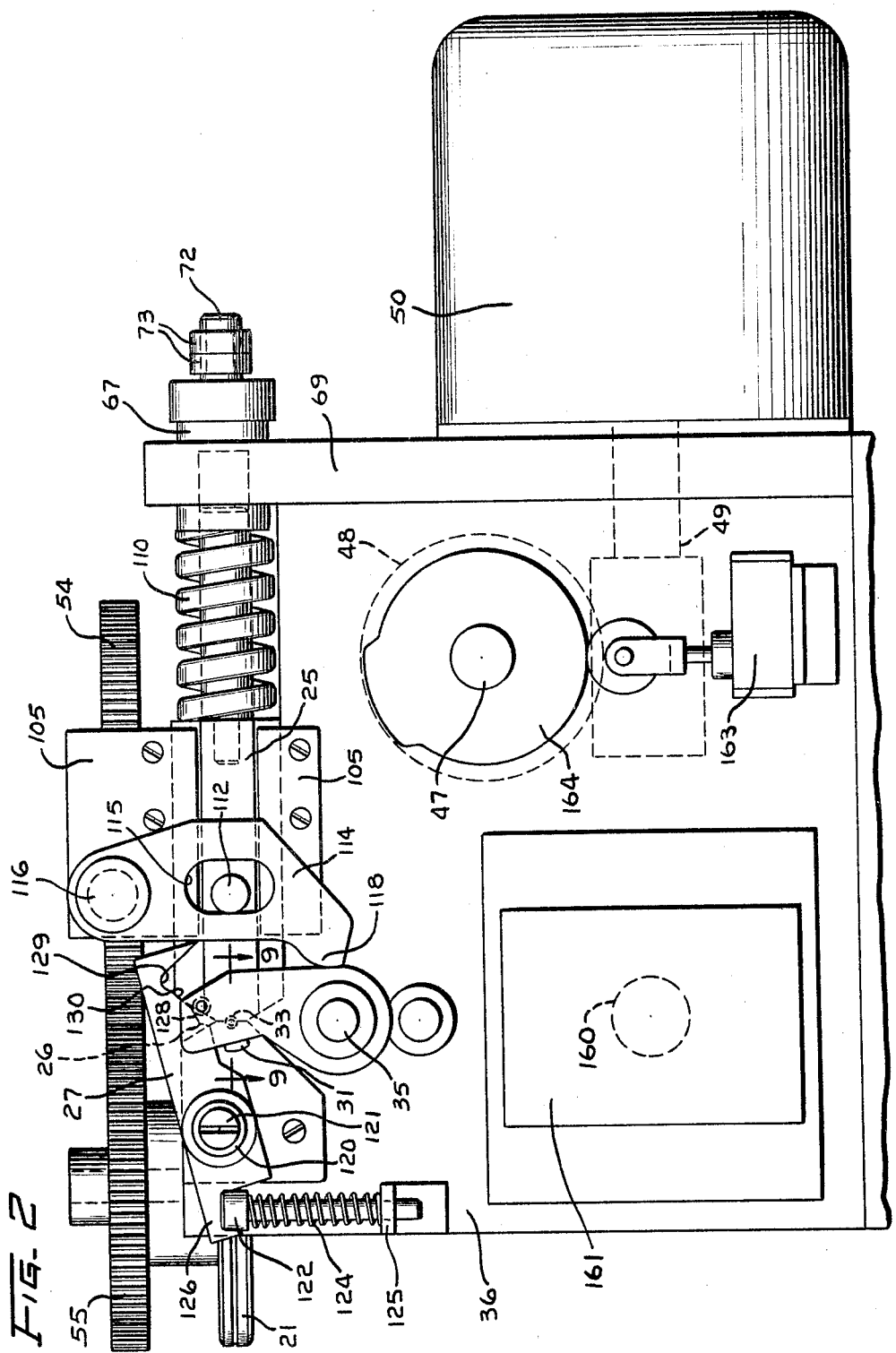

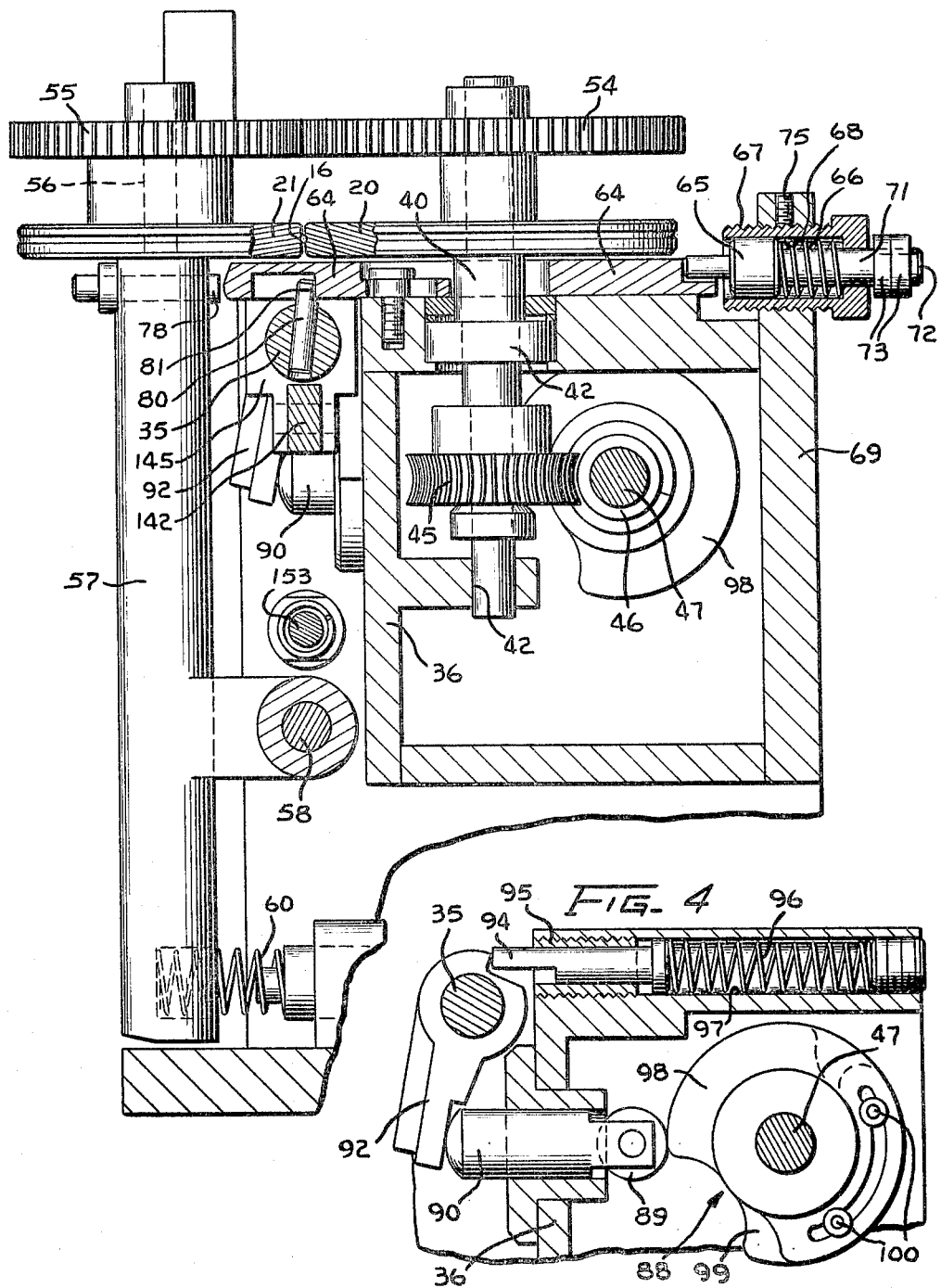

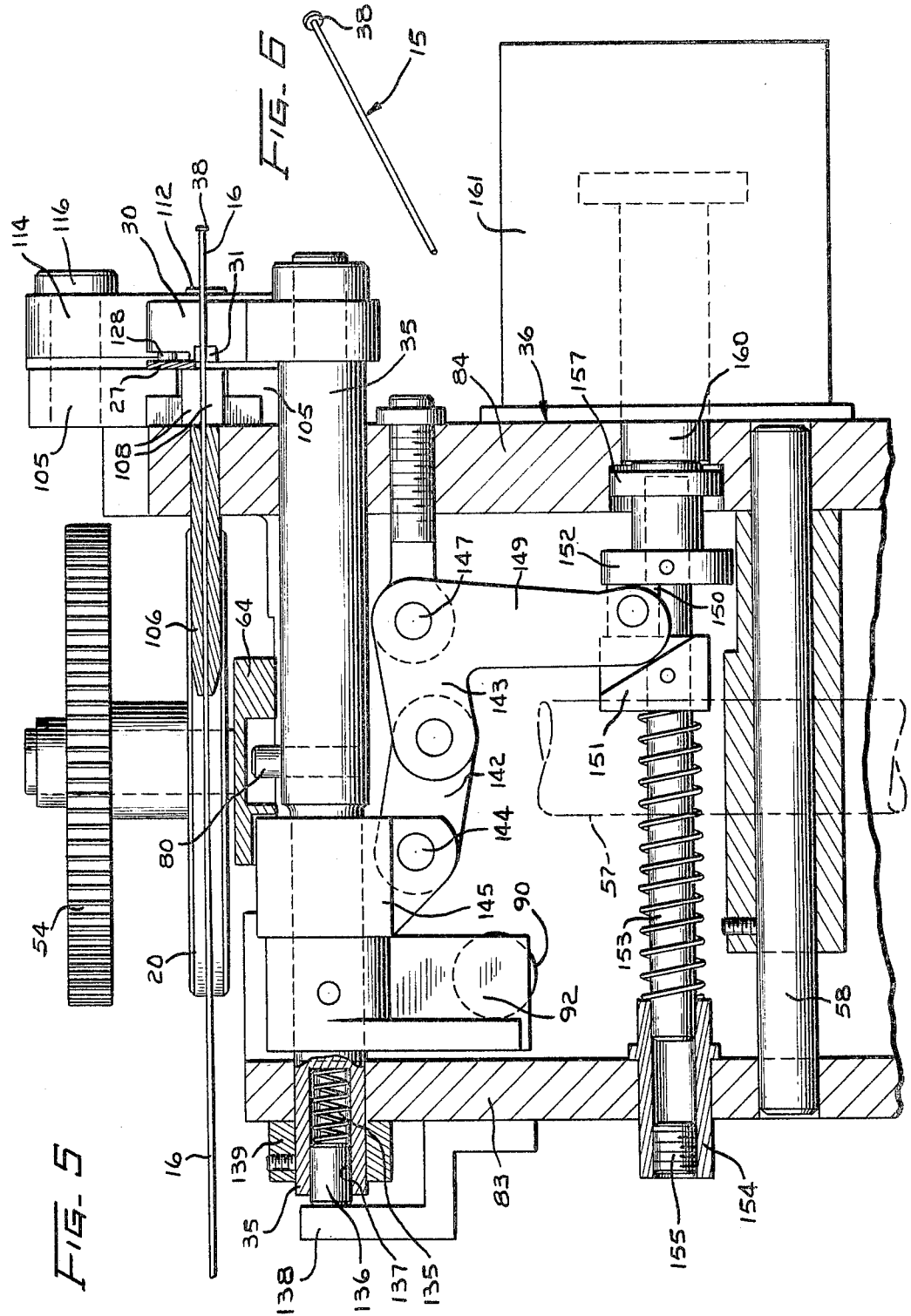

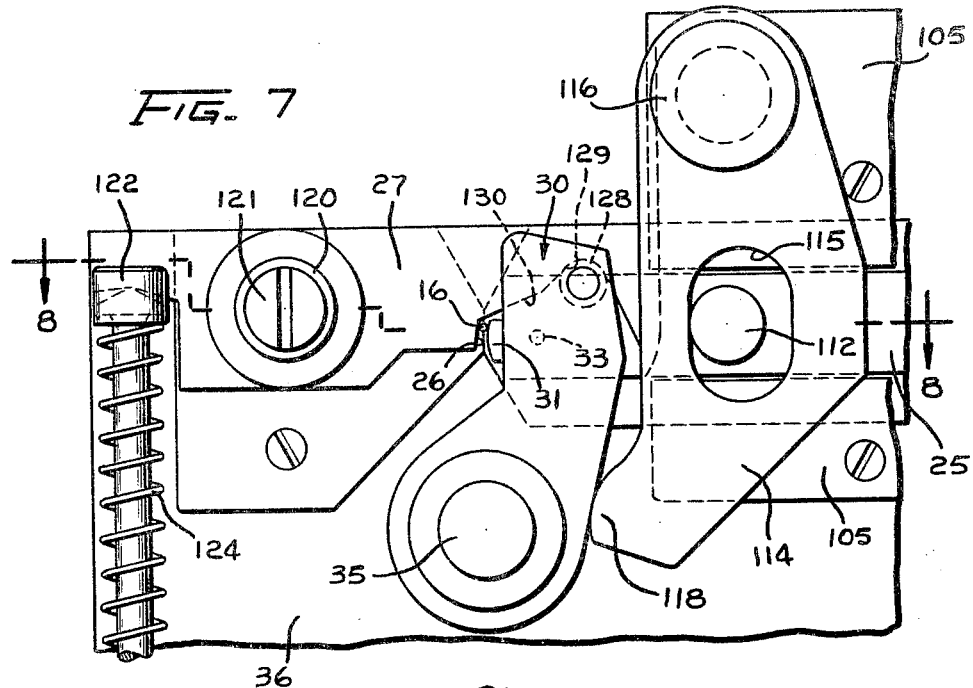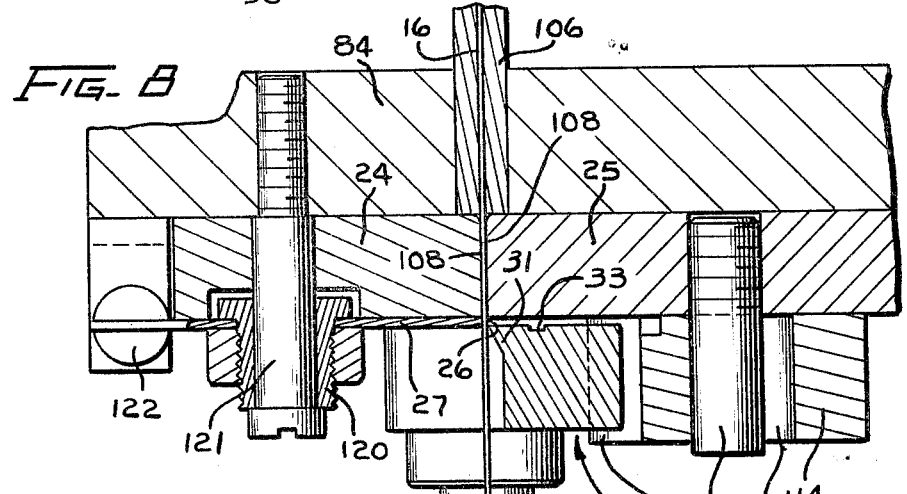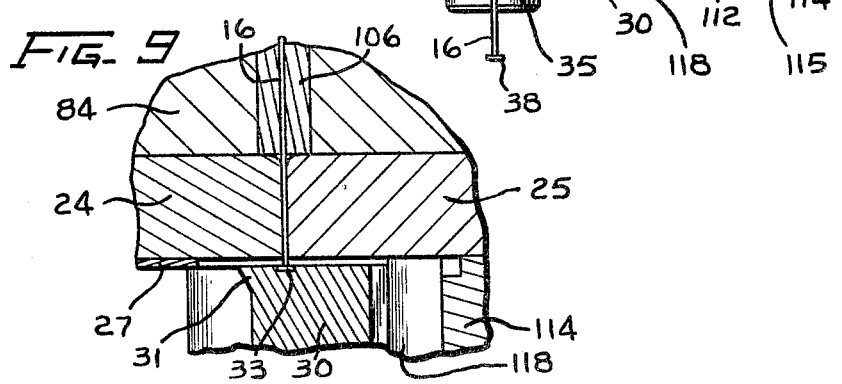

This invention relates to heading apparatus, and more particularly to an apparatus for forming headed leads for electrical components.

An object of the present invention is to provide an efficient and effective heading apparatus.

Another object of the invention is to provide an apparatus for forming headed leads for electrical components.

An apparatus illustrating certain aspects of the invention may include a pair of rotary feed wheels which are actuated intermittently into engagement with a straight wire to advance it successively between a pair of relatively movable jaws and past a shear member on one side of the wire and past a heading tool mounted in a normal first position on the other side of the wire and in spaced relation to the jaws. The heading tool is provided with a cutting edge and a head forming recess and is actuated transversely of the wire to a second position to cause the cutting edge of the heading tool to shear the wire against the shear member and thereby sever a headed lead from the wire, and to position the heading recess of the heading tool in alignment with the end of the wire. In response to the lateral movement of the heading tool to its second position, the feed wheels are disengaged from the wire, the jaws are actuated to grip the wire, and the shear member is moved to a retracted position. The heading tool is then reciprocated axially and cooperates with the jaws to upset the end of the wire and form a head thereon. The heading tool is then returned laterally to its first position in response to which movement the shear member is likewise returned to its normal position, the jaws are actuated to release the wire, and the feed rollers are moved into engagement with the wire to effect the advance thereof for the next cycle of operation.

Other objects, advantages and novel aspects of the invention will become apparent upon consideration of the following detailed description, in conjunction with the accompanying drawings, in which:

FIG. 1 is a plan view of the apparatus for forming headed leads;

FIG. 2 is a front view of the apparatus showing the wire shearing and the wire heading components in one position;

FIG. 3 is a vertical cross-sectional view of the apparatus taken along the line 3—3 of FIG. 1;

FIG. 4 is a fragmentary vertical cross-sectional view of the apparatus taken on the line 4—4 of FIG. 1;

FIG. 5 is a vertical longitudinal sectional view taken on the line 5—5 of FIG. 1;

FIG. 6 is an enlarged view of a headed lead;

FIG. 7 is an enlarged fragmentary front view of the apparatus showing the wire shearing and the wire heading components in another position;

FIG. 8 is an enlarged fragmentary horizontal cross-sectional view of the apparatus taken on the line 8—8 of FIG. 7; and FIG. 9 is a fragmentary horizontal sectional view through the wire shearing and the wire heading components of the apparatus taken on line 9—9 of FIG. 2.

The apparatus for forming headed leads 15 (FIGS. 1 and 6) from a wire 16 comprises, generally speaking, a pair of rotating feed wheels 20 and 21 which are actuated intermittently into engagement with the wire 16 to advance the wire successively along a horizontal axis between a pair of relatively movable anvil elements or jaws 24 and 25 and past a shearing edge 26 of a shear blade 27 (FIG. 7) on one side of the wire 16, and past a heading tool 30 mounted in a normal first position (FIG. 7) on the other side of the wire 16 and in spaced relation to the jaws 24 and 25 (FIG. 8). The heading tool 30 is provided with a cutting edge 31 and a head forming recess 33 in laterally spaced relation to each other and is fixedly secured to a shaft 35 that is supported in a frame 36 for oscillatory movement about its axis and for longitudinal movement parallel to the wire.

Suitable mechanism later to be described is provided for oscillating the shaft to move the heading tool laterally to a second position (FIG. 2) to cause the shearing edge 31 to shear the wire 22 against the shearing edge 26 of the shear blade 27 and thereby sever a lead 15 from the wire 16 and to position the forming recess 33 of the heading tool 30 in alignment with the end of the wire 16. The heading tool 30 is then reciprocated axially of the wire to and from the jaws 24 and 25 and cooperate therewith to upset the end of the wire and form a head 38 thereon, after which the heading tool 30 is returned laterally to its first position (FIG. 7). Mechanisms actuated by the shaft 35 in response to oscillatory movement thereof serve to actuate the feed wheels 20 and 21 into and out of feeding engagement with the wire, to effect the movement of the jaw 25 relative to the jaw 24 to grip and release the wire, and to control the movement of the shear blade 27 to and from the normal and retracted positions in timed relation to the operation of the heading tool 30 to effect the heading, feeding, and severing of successive leads 15.

Considering the apparatus in more detail, the wire feed wheel 20 (FIG. 3) is keyed to a vertically disposed shaft 40 which is supported in bearings 42 in the frame 36 of the apparatus. A worm gear 45 keyed to the shaft 40 meshes with a worm gear 46 on a horizontally disposed drive shaft 47 which is suitably supported in the frame 36 and is rotated through gears 48 and 49 by a motor 50 (FIG. 2). Also keyed to the shaft 40 for rotation with the feed wheel 20 is a gear 54 which is in constant mesh with a gear 55 that is secured to the hub of the feed wheel 21 for imparting rotation thereto at the same peripheral speed as that of the feed wheel 20.

The gear 55 and the feed wheel 21 are rotatably supported on a stub shaft 56 extending upwardly from the upper end of an arm 57. Intermediate its ends, the arm 57 is supported on a horizontally disposed rod 58 for pivotal movement about the axis of the rod which is disposed below and in a vertical plane tangent with the periphery of the feed wheel 20. A compression spring 60 engages the lower end of the arm 57 and stresses the arm for rotation in a direction to urge the feed wheel 21 toward the feed wheel 20 into driving engagement with the wire 16 for imparting longitudinal movement thereto.

To arrest the feeding movement of the wire 16, the feed wheel 21 is adapted to be moved a relatively short distance away from the feed wheel 20 by means of a pusher bar 64 (FIGS. 1 and 3) which is slidably supported on a horizontal frame plate of the hollow frame 43 and is engageable with the upper portion of the arm 57. The pusher bar 64 which is slotted to provide clearance for the shaft 40 is urged to the left as viewed in FIG. 3 by a plunger 65 and a spring 66, the latter being of sufficient strength to overcome the opposing force of the spring 60. The plunger 65 is mounted for sliding movement in a sleeve 67 that is externally threaded and is supported in a threaded aperture 68 in a vertical frame plate 69 of the frame 36.

The spring 66 is positioned between a shoulder at one end of the sleeve and a shoulder formed on the plunger by the reduced shank 71 thereof which extends through the shouldered end of the sleeve and has a reduced threaded portion 72. A pair of lock nuts 73 on the threaded portion 72 form a stop engageable with the end of the sleeve 67 to limit the advancing movement of the plunger 65 relative to the sleeve 67. Thus, by adjusting the position of the sleeve 67 and the frame plate 69 and locking it by means of a set screw 75, the plunger 65 can be controlled to effect the movement of the pusher bar 64 and the arm 57 so as to retract the feed wheel 21 from the feed wheel 20 a relatively short distance to effect the release of the wire 16 and thereby arrest its forward movement. A rod 78 is adjustably mounted on the arm 57 for engagement by the forward end of the pusher bar 64.

To effect a gripping engagement of the feed wheels 20 and 21 with the wire 16, under the influence of the spring 60, and the feeding of the wire 16 at regular intervals, the pusher bar 64 is retracted to the right as viewed in FIG. 3 by a finger 80 which engages a shoulder 81 on the pusher bar 64 and is secured to and extends from the actuating shaft 35. The actuating shaft 35 (FIG. 5) is supported in vertical frame plates 83 and 84 of the frame 36 for rocking movement about its axis and for axial movement. Rocking movement in a clockwise direction as viewed in FIG. 4 is imparted to the actuating shaft 35 by mechanism including a cam 88 secured to the drive shaft 47. The cam 88 engages a roller 89 on a push rod 90 supported on the frame 36 for horizontal movement and engages a rocker arm 92 keyed to the actuating shaft 35. Return movement in a counterclockwise direction is imparted to the actuating shaft 35 by a plunger 94 and a spring 96 supported in a bore 97 in the frame 36. A head on the plunger 94 engages the end of a sleeve 95 threaded in the bore 97 to limit the travel of the plunger to a predetermined position so that when the roller 89 rides on the low portion of the cam 88 no pressure is applied to the actuating shaft 35 which would interfere with axial movement thereof.

The cam 88 has a lobe 98 which effects the reciprocation of the plunger 90 and determines the extent of the interval feeding movement and the interval of dwell of the wire 16 for each cycle of rotation of the shaft 47. In order to vary the relation of the intervals of dwell and of feeding movement and thereby provide for the selective feeding of leads of various lengths, the lobe 98 is provided with an auxiliary lobe 99. The latter is adjustably secured to one side of a portion of lobe 98 by a pair of fasteners 100 and may be advanced or retracted to obtain the desired feed of the wire and length of the lead formed thereby.

As previously indicated, the oscillatory movement of the actuating shaft 35 also causes the transverse oscillatory movement of the heading tool 30 to and from the first position on one side of the wire as shown in FIG. 7, and the second position shown in FIG. 2 during the latter or counter-clockwise oscillatory movement of which heading tool a headed lead 15 is sheared from the wire 16 and the head forming recess 33 is aligned with the end of the wire 16 projecting from between the jaws 24 and 25 (FIG. 9).

Actuation of the movable jaw 25 to open position relative to the stationary jaw 24 is also effected by the oscillatory movement of the heading tool 30. The jaw 24 is fixedly secured to the vertical frame member 84 of the frame 36 and the jaw 25 is supported for horizontal movement between a pair of guide members 105 secured to the frame plate 84. As the wire 16 is advanced by the feed wheels 20, 21 it passes through a tubular guide 106 secured to the frame plate 84 and through a pair of shallow opposing grooves 108 formed in the opposing adjacent ends of the jaws 24 and 25 and is guided for movement thereby when the jaws are in open position and are gripped therebetween and held against movement when the jaw 25 is in closed position. A compression spring 110 (FIG. 2) interposed between the end of the movable jaw 25 and the frame plate 69 urges the jaw 25 to the closed position.

As shown in FIGS. 2, 7 and 8, a pin 112 extending laterally from the movable jaw 25 engages a lever 114 in an aperture 115 therein, the lever 114 being pivotally supported at its upper end on a pin 116 on the upper guide member 105 and the lower end 118 of the lever engaging the side of the heading tool 30. The arrangement is such that in response to counter-clockwise oscillatory movement of the heading tool 30 from the first position (FIG. 7) to the second position (FIG. 2), the lower end of the lever 114 moves therewith under the influence of the spring 110 to effect the actuation of the jaw 25 to its closed position, and in response to the reverse oscillatory movement of the heading tool 30, the lever 114 is actuated to effect the retraction of the jaw 25 through the pin 112 through a relatively short distance to its open position.

The shear blade 27 is also actuated to and from a normal position (FIG. 7) and a retracted position (FIG. 2) in timed relation to the oscillatory movement of the heading tool 30 to and from the first position and the second position to provide clearance for axial movement of the heading tool 30 in the latter position. As shown in FIGS. 2, 7 and 8, the shear blade 27 which has a hub 120 is supported intermediate its ends on a fixed pivot 121 and is urged for pivotal movement thereabout in a clockwise direction by a plunger 122 and a spring 124 interposed between a fixed support 125 and the end 126 of the shear blade. A roller 128 mounted on the upper end of the heading tool 30 engages a recessed portion 129 of the shear blade 27 to stop the shear blade in a normal operative position as shown in FIG. 7 with the shearing edge 26 positioned adjacent to and on one side of the axis or path of longitudinal movement of the wire 16 and in a predetermined spaced relation to the jaws 24 and 25. In response to movement of the heading tool 30 to its second position as shown in FIG. 2, the roller engages an oblique cam surface 130 of the shear blade and rocks the shear blade to the tilted retracted position (FIG. 2) in which it is out of the path of axial movement of the heading tool 30 during the head forming operation.

Referring to FIG. 5, the mechanism for effecting the axial reciprocation of the actuating shaft 35 and the heading punch 30 includes a spring 135 and a plunger 136 mounted in an axial bore 137 in one end of the actuating shaft 35, the plunger 136 abutting a stationary member 138 on the frame 36 (FIG. 1). The spring 135 serves to move the actuating shaft 35 and the heading tool 30 axially to the right as viewed in FIG. 5 to an advanced normal position spaced a predetermined distance from the outer faces of the jaws 24 and 25. A collar 139 on the end of the actuating shaft limits the axial movement of the actuating shaft to its normal position.

The mechanism also includes a pair of interconnected toggle links 142, 143, the former being pivotally attached at 144 to a connector element 145 loosely mounted on the actuating shaft 35 in engagement with the boss of the rocker arm 92. The link 143 is connected at one end for pivotal movement about a fixed pin 147 on the vertical frame plate 84 and has a downwardly directed arm 149.

A slide block 150 pivotally mounted on the end of the arm 149 is positioned between a collar 151 and an enlarged end 152 of a rod 153 for operatively connecting the arm 149 to the rod 153 for actuation thereby. One end of the rod 153 is supported in a tubular bearing 154 on the vertical frame plate 83 in which sleeve a stop 155 is adjustably mounted to limit movement of the rod to the left.

The enlarged end 152 of the rod is slidably supported in a bore 157 in the vertical frame plate 84 and is urged by a compression spring 153 into engagement with an actuating plunger 160. The plunger 160 is operated by a solenoid 161 in response to energization thereof to effect the actuation of the toggle from the bent to a straightened position and the movement of the heading tool 30 to the left from its normal position into engagement with the jaws 24 and 25 to effect the upsetting of the end of the wire 16 and the formation of the head 38 thereon. The solenoid 161 which is fixedly mounted on the frame plate 84 is connected to a source of electrical power and is energized at predetermined intervals under control of a switch 163 which is actuated by a timing cam 164 mounted on the drive shaft 47.

Operation

In the selected embodiment of the apparatus the drive shaft 47 is continuously rotated by the motor 50 to effect the continuous rotation of the feed wheels 20, 21 and the cyclic sequential longitudinal reciprocatory and oscillatory movements of the actuating shaft 35. Starting with the follower 89 riding on the high part of the cam 88 (FIG. 4), the actuating shaft 35 has been oscillated in a clockwise direction to a first position with the heading tool 30 in the first position as shown in FIG. 7, the jaw 25 is in its open position, the pusher bar 64 is in its retracted position, and the feed wheels 21 and 22 under the influence of the spring 60 are in gripping engagement with the wire 16 to effect the feeding of the wire and the advancement of the headed end portion of the wire 16 from the jaws 24 and 25. As the follower 89 rides off of the high part of the cam 88, the actuating shaft 35 under the influence of the spring 96 is oscillated in a counterclockwise direction to its other position, in response to which movement the feed wheel 21 is actuated to open position under the influence of the spring 66 to stop the feeding movement of the wire 16. Also in response to this counterclockwise movement of the actuating shaft 35, the heading tool 30 is oscillated to its second position (FIG. 2) resulting in the cutting edge 31 on the heading tool 30 shearing the wire 16 against the shearing edge 26 of the shear blade 27 at a point on the wire spaced from the jaws 24, 25 to sever a headed lead 15, and the positioning of the heading recess 33 of the heading tool in alignment with the leading end of the wire 16, and resulting in the movement of the shear blade 27 to the retracted position. Also, the movement of the heading tool 30 to the second position also results in the movement of the jaw 25 to closed position under the influence of the spring 110 to clamp the wire 16 against the stationary jaw 24. At this time, the switch 163 is actuated by the cam 164 to effect the energization of the solenoid 161 and the longtiudinal reciprocation of the actuating shaft 35 and the heading tool 30 thereon resulting in the upsetting of the end portion of the wire 16 projecting from the jaws 24, 25 and the formation of the head 38 on the end of the wire 16. Thereafter the actuating shaft 35 is oscillated in a clockwise direction to its original position under the influence of the cam 88 thereby completing a cycle of operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:
1. An apparatus for forming headed leads from wire: means to advance the wire to a predetermined position; anvil means for gripping the wire when in the predetermined position;
a shear member spaced from said anvil means;
a heading tool mounted adjacent said shear member for axial and pivotal movement and having a shear thereon;
means for pivoting said heading tool to cause said shear thereon to engage said shear member and to cut the wire therebetween; and
means for axially moving said heading tool toward said anvil means to effect the heading of the wire gripped by said anvil means.

2. An apparatus for forming headed leads from wire: means to advance the wire to a predetermined position; anvil means for gripping the wire when in the predetermined position;
a movable shear member spaced from said anvil means;
a heading tool mounted for axial and pivotal movement adjacent said shear member and having a shear thereon;
means for pivoting said heading tool to cause said shear thereon to engage said shear member and to cut the wire therebetween;
means responsive to the pivotal movement of said heading tool for moving said shear member after the wire is cut to permit axial movement of said heading tool; and
means for axially moving said heading tool toward said anvil means to effect the heading of the wire gripped by said anvil means.

3. In a heading apparatus:
anvil means for gripping a wire and for releasing the wire for movement along an axis;
a heading tool provided with a forming recess cooperable with said anvil means to form a head on the end of the wire and provided with a cutting edge;
means for mounting said heating tool adjacent said anvil means in axially spaced relation thereto for axial reciprocation into engagement therewith and for movement transversely of the axis to a first position on one side of the axis;
means for actuating said heading tool transversely of the axis from the first position to a second position to align the forming recess with the end of the wire;
means having a shearing edge disposed on the other side of the axis and in spaced relation to said anvil means cooperable with said cutting edge to shear the wire in response to movement of said heading tool to the second position; and
means for reciprocating said heading tool while it is in said second position to effect the heading of the wire.

4. In a heading apparatus the combination of:
means for clamping a wire and for releasing the wire for longitudinal movement along an axis;
a heading tool provided with a forming recess cooperable with said wire clamping means for upsetting the end of the wire and forming a head thereon;
a cutting edge on said heading tool;
means for mounting said heading tool adjacent said wire clamping means in axially spaced relation thereto for axial reciprocation into engagement with said wire clamping means and for movement transversely of said axis to a first position on one side of said axis;
a shear member mounted adjacent said wire clamping means on the other side of said axis cooperable with said cutting edge to shear the wire in spaced relation to said jaws;
means for actuating said heading tool transversely of the axis from said first position to a second position to effect the shearing of the wire and the alignment of the forming recess with said axis and the end of the wire; and
means for reciprocating said heading tool while it is in said second position to effect the heading of the wire.

5. A heading apparatus comprising:
a pair of relatively movable jaws for guiding a wire for movement along an axis and for clamping the wire against movement;
a heading tool having a recess cooperable with said jaws for upsetting the end of the wire and forming a head thereon and having a cutting edge;

means for mounting said heading tool adjacent to said jaws in a normal first position in axially spaced relation to the jaws and on one side of said axis and for axial movement relative to the jaws and for lateral movement from said first position to a second position with the heading recess aligned with said axis;

a movable shear member mounted adjacent said jaws on the other side of said axis cooperable with said cutting edge on said heading tool for shearing the wire in spaced relation to said jaws in response to movement of said heading tool to said second position;

means for moving said heading tool laterally to said first position and to said second position;

means for reciprocating said heading tool parallel to said axis while said tool is in said second position to effect the heading of the wire;

means operable in timed relation to the actuation of said heading tool for actuating said jaws to effect the clamping and release of the wire;

means operable in timed relation to the actuation of said heading tool for intermittently advancing the wire; and means operable in timed relation to the actuation of said heading tool for moving said shear member to said normal position and to a retracted position, in the latter of which clearance is provided for axial reciprocation of said heading tool.

6. A heading apparatus comprising:

means for moving a wire along an axis;

a pair of relatively movable anvil elements for clamping the wire;

a heading tool having a recess cooperable with said anvil elements for upsetting the end of the wire and forming a head thereon;

means for mounting said heading tool adjacent said anvil elements in a normal first position in axially spaced relation to said anvil elements and on one side of said axis for axial movement relative to the anvil elements and for lateral movement from said first position to a second position with the recess aligned with said axis;

a retractable shearing member pivotally mounted in a normal position adjacent said anvil elements on the other side of said axis and having a shearing edge spaced axially from said anvil elements and adjacent said axis;

a cutting edge on said heading tool cooperable with said shearing edge for shearing the wire in response to lateral movement of said heading tool to said second position;

means for moving said heading tool laterally to said first and to said second positions;

means on said heading tool for moving said shearing member to a retracted position after the shearing of the wire and in response to movement of said heading tool to said second position to provide clearance for axial movement of said heading tool;

means for reciprocating said heading tool parallel to said axis while said heading tool is in said second position to effect the heading of the wire;

means responsive to the lateral movement of said heading tool to said first and to said second positions for rendering said wire feeding means operative and unoperative respectively; and means responsive to lateral movement of said heading tool to said first and to said second positions for moving said anvil elements into gripping and released relation to the wire.

7. An apparatus for forming headed leads comprising:

means for guiding a wire along an axis;

a pair of jaws;

resilient means for actuating said jaws to closed position to clamp the wire;

a heading tool having a recess cooperable with said jaws for forming a head on the end of the wire;

means for supporting said heading tool in a first position in spaced relation to said jaws and on one side of said axis for axial movement into engagement with said jaws and for lateral movement transversely of said axis from said first position to a second position with said recess in alignment with said axis;

a retractable shear blade supported adjacent said jaws and having a shearing edge spaced axially from said jaws and in a normal position on the other side of said axis and in close proximity thereto;

a cutting edge on said heading tool cooperable with said shearing edge for shearing the wire in spaced relation to said jaws in response to movement of said heading tool to said second position;

means for intermittently moving said heading tool laterally to said first position and to said second position;

means for reciprocating said heading tool parallel to said axis while said heading tool is in said second position to effect the heading of the wire;

means responsive to the lateral movement of said heading tool to said first position for actuating said jaws to open position to release the wire;

means responsive to the lateral movement of said heading tool to said first position for effecting the longitudinal movement of the wire; and means responsive to the lateral movement of said heading tool to said second position for moving said shear blade to a retracted position to provide clearance for axial movement of said heading tool.

8. An apparatus for forming headed leads comprising:

a pair of anvil elements for guiding a wire therebetween along a first axis;

mounting means for supporting said anvil elements for movement of one relative to the other;

resilient means for urging said one element toward the other to hold the wire against movement;

an actuating member supported on said mounting means for oscillatory movement about and for axial movement along an axis parallel to said first axis;

a heading tool secured to said actuating member and having a forming recess cooperable with said anvil elements for upsetting the end of the wire and forming a head thereon;

means for oscillating said actuating member to move said heading tool to a first position on one side of said first axis and to a second position with said head forming recess disposed in alignment with said first axis;

resilient means for urging said actuating member axially to a normal position with said heading tool spaced a predetermined distance from said anvil elements;

means for moving said actuating member axially in the reverse direction while said heading tool is in the second position to effect the heading of the end of the wire against said anvil elements;

a retractable shear member pivotally mounted adjacent said anvil elements and having a shearing edge spaced said predetermined distance from said anvil elements;

resilient means for urging said shear member to a normal position with the shearing edge thereof disposed adjacent said axis and on the other side thereof;

a cutting end on said heading tool cooperable with said shearing edge to shear the wire in response to movement of said heading tool to said second position;

means responsive to the movement of said heading tool to said second position for moving said shear member to a retracted position to provide clearance for axial movement of said heading tool;

a pair of cooperable rotary feed wheels for advancing said wire along said axis;

means for simultaneously rotating said feed wheels;

resilient means for urging one of said feed wheels toward the other feed wheel to grip the wire therebetween and effect the feeding movement thereof; and means responsive to the movement of said hading tool to said second position for moving said one feed wheel from the other to release the wire.

9. A heading apparatus comprising:

a pair of jaws for guiding a wire therebetween along a first axis;

mounting means for supporting said jaws for movement of one relative to the other;

resilient means for urging said one jaw toward the other to hold the wire against movement;

an actuating member supported on said mounting means for oscillatory movement about and for axial movement along an axis parallel to said first axis;

a heading tool secured to said actuating member for oscillatory and axial movements therewith and disposed adjacent to said jaws in a first position spaced a predetermined distance therefrom and on one side of said first axis, said heading tool having a head forming recess cooperable with said jaws for upsetting the end of the wire and forming a head thereon and having a cutting edge;

a shear member mounted adjacent said jaws on the other side of said first axis and having a shearing edge spaced a predetermined distance from said jaws and cooperable with said cutting edge on said heading tool for shearing the wire;

means for oscillating said actuating member to effect the movement of said heading tool from the first position to a second position to effect the shearing of the wire and the alignment of the forming recess with the end of the wire;

means responsive to the movement of said heading tool to said second position for moving said shear member to a retracted position to provide clearance for the axial reciprocation of said heading tool;

means for reciprocating said actuating member while said heading tool is in said second position to effect the upsetting of the end of the wire and the forming of a head thereon;

means actuated by said actuating member in response to the oscillatory movement of the heading tool to said first position to effect the movement of said one jaw to release the wire; and means responsive to the movement of said heading tool to said first position for advancing the wire along the axis.

References Cited by the Examiner

UNITED STATES PATENTS

| | | | |
|---|---|---|---|
| 2,759,379 | 8/1956 | Brandt | 72—297 |
| 3,031,908 | 5/1962 | Lejdegard | 10—25 |
| 3,123,846 | 3/1964 | Prutton | 72—312 |

CHARLES W. LANHAM, *Primary Examiner.*

G. P. CROSBY, *Examiner.*